Jan. 29, 1929.  W. SENGSTAKEN  1,700,241
DRILL
Filed Sept. 16, 1926
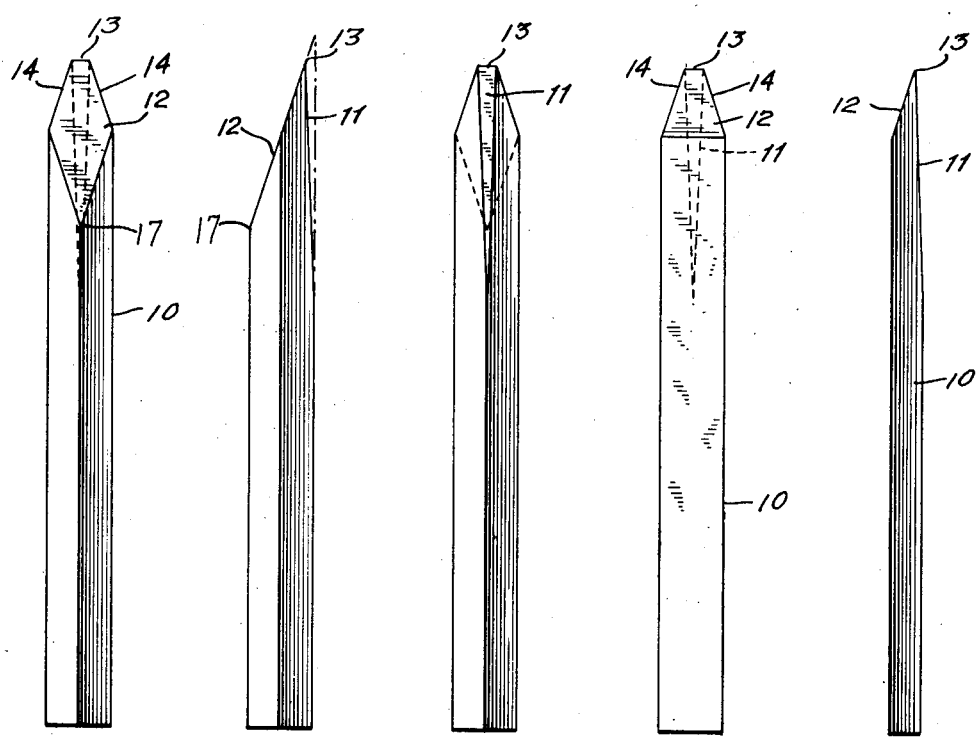
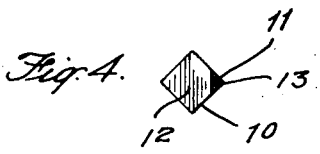
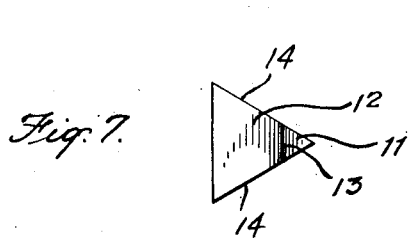
INVENTOR
WILLIAM SENGSTAKEN
BY
Moses & Nolte
ATTORNEY Patented Jan. 29, 1929.

1,700,241

UNITED STATES PATENT OFFICE.

WILLIAM SENGSTAKEN, OF BROOKLYN, NEW YORK.

DRILL.

Application filed September 16, 1926. Serial No. 135,759.

The present invention relates to drills particularly adapted to bore into stone, concrete, tile, glass, brick, ceramics, and other vitreous materials, and to a new method of boring such materials for which said drills are adaptable.

A principal object of my invention is to provide a drill which will be effective to bore into the materials above referred to and the like without splitting or chipping the same.

Another object is to provide a drill which will have a reaming as well as a boring action.

Another object is to provide a drill which may be easily sharpened.

Other objects will be apparent from reading this specification in connection with the accompanying drawings, in which Fig. 1 is a vertical view of my drill made from a bar of metal square in cross section;

Fig. 2 is a view of the same drill as shown in Fig. 1 taken at right angles thereto;

Fig. 3 is a rear view of the drill shown in Fig. 1;

Fig. 4 is a plan view of Fig. 2 looking at the same from the top;

Fig. 5 is a form of my drill in which the shank is of triangular cross section;

Fig. 6 is a view of the form of drill shown in Fig. 5 taken at right angles thereto; and Fig. 7 is an enlarged plan view of Fig. 6, looking at the same from the top.

Referring now in detail to the drawings, 10 represents my drill as a whole, which is provided with a flat, slightly inclined surface 11 on one side of its operative end and a comparatively steep inclined surface 12 on the other side of its operative end, terminating in the line edge 13 at such operative end of the drill. This edge 13, on account of the different degrees of declination of the opposed flat surfaces, is located off the axial center of the drill.

In operation the drill is inserted in a brace or other suitable holder, and subjected to a rotating movement on the material to be bored. The drill is centered in the usual way. As the drilling of the material progresses, the edge 13 is bored into the material and the side tapering edges 14 scrape or ream the sides of the bore until the width of the bore for which such drill is adapted has been reached, which is somewhat greater than the greatest width of the operative portion of the drill, owing to the boring edge being located off center. Such width will then be maintained for the depth it is desired to make such bore, except for the portion known as the "dead-hole", which corresponds to the end of the drill and the tapering sides thereof. When it is desired to bore through a material, the boring will be continued until the full diametrical capacity of the drill has passed through the material, unless it is desired to provide for a tapered lower portion of the bore.

In order to sharpen my drill the flat sloping surfaces 11 and 12 are subjected to the usual grinding process for the purpose of making them absolutely flat and for the purpose of sharpening the lines of intersection between said surfaces and the sides of the tool, giving to the edge 13 a sharp termination.

In Figs. 5, 6 and 7 my drill is shown as having been made of stock of triangular cross section. This form of drill is preferable for some purposes over that of the square cross section shown in Figs. 1 to 4, inclusive, because the edges terminating in the points 17 of Figs. 1 and 2 are done away with, so that the conical portion of the hole is materially lessened, the hole being cylindrical for its entire length, except for the short tip formed by the triangular surface 12.

I have described what I believe to be the best embodiment of my invention and the method of practicing the same. I do not wish to be confined, however, to the embodiment shown, but what I desire to protect by Letters Patent is set forth in the appended claims.

What I claim is:

1. In a drill for boring stone, concrete, tile, glass, brick, ceramics and the like, a bar, angular in cross section, said bar being provided with a slightly inclined flattened surface at one of its angles and a comparatively steep inclined flattened surface diametrical thereto, said inclined surfaces meeting in a line off the axis of said bar.

2. A drill for boring stone, concrete, tile, glass, brick, ceramics and the like, angular in cross section, and being provided with a slightly inclined flattened surface at one of its angles and a comparatively steep inclined flattened surface diametrical thereto, said inclined surfaces meeting in a line off the axis of said drill.

In testimony whereof I have affixed my signature to this specification.

WILLIAM SENGSTAKEN.